(12) United States Patent
Oyachi (10) Patent No.: US 10,567,663 B2
(45) Date of Patent: Feb. 18, 2020

(54) IMAGE PICKUP APPARATUS, CONTROL METHOD THEREFORE, AND PROGRAM COMMUNICATING WITH AN EXTERNAL DEVICE

(71) Applicant: CANON KABUSHIKI KAISHA, Tokyo (JP)

(72) Inventor: Takahiko Oyachi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/891,245

(22) Filed: Feb. 7, 2018

(65) Prior Publication Data

US 2018/0234634 A1 Aug. 16, 2018

(30) Foreign Application Priority Data

Feb. 14, 2017 (JP) ................................. 2017-025379

(51) Int. Cl.
*H04N 5/262* (2006.01)
*H04N 5/232* (2006.01)

(52) U.S. Cl.
CPC ....... *H04N 5/23296* (2013.01); *H04N 5/2628* (2013.01); *H04N 5/23216* (2013.01)

(58) Field of Classification Search
CPC ........... H04N 5/23229; H04N 5/23261; H04N 5/32396; H04N 5/23216; H04N 5/232; H04N 5/23206

See application file for complete search history.

(56) References Cited

U.S. PATENT DOCUMENTS

| | | | | |
|---|---|---|---|---|
| 6,052,509 A * | 4/2000 | Abe | ...................... | H04N 5/232 348/E5.042 |
| 10,148,886 B2 * | 12/2018 | Kim | .................... | H04N 5/23245 |
| 2015/0022680 A1 * | 1/2015 | Idaka | ................. | H04N 5/23206 348/211.4 |
| 2016/0335981 A1 * | 11/2016 | Koo | ....................... | G09G 5/003 |
| 2017/0150051 A1 * | 5/2017 | Ito | .......................... | G03B 15/00 |
| 2017/0264827 A1 * | 9/2017 | Dao | .................... | H04N 5/23206 |

FOREIGN PATENT DOCUMENTS

| | | |
|---|---|---|
| JP | 2016-45813 A | 4/2016 |
| JP | 2016-167722 A | 9/2016 |

* cited by examiner

*Primary Examiner* — Kelly L Jerabek
(74) *Attorney, Agent, or Firm* — Canon U.S.A., Inc. IP Division (57) ABSTRACT

An image pickup apparatus includes a receiver that receives, from an external apparatus, an instruction for changing a zoom position of a lens, a controller that performs control processing to change a zoom position of the lens based on a received instruction, and a determination unit that determines whether the external apparatus includes a function regarding zooming of the lens. When the determination unit determines that the external apparatus includes the function, the controller controls a zoom adapter, which performs a zoom setting of the lens and is attached to the lens, to change a zoom position of the lens based on a zoom setting notified by the external apparatus. When the determination unit determines that the external apparatus does not include the function, the controller controls the zoom adapter to change a zoom position of the lens based on a zoom setting performed in the zoom adapter.

16 Claims, 6 Drawing Sheets

IMAGE PICKUP APPARATUS, CONTROL METHOD THEREFORE, AND PROGRAM COMMUNICATING WITH AN EXTERNAL DEVICE

BACKGROUND

Field

The present disclosure relates to a method for controlling an image pickup apparatus.

Description of the Related Art

Recently, with the extension of a camera communication function, the number of systems in which a camera image capturing function can be controlled from an external apparatus such as a smart phone has increased. As such systems, systems in which the zoom position of a lens can be controlled from an external apparatus are known.

There are various lens zoom methods. For example, Japanese Patent Laid-Open No. 2016-45813 discloses a method of controlling a zoom magnification and a zoom speed by a touch operation. Japanese Patent Laid-Open No. 2016-167722 discloses a lens control method of displaying a power zoom control screen when detecting that an attached interchangeable lens includes a power zoom function and determining a zoom speed in accordance with a touch position on the screen.

SUMMARY

The present disclosure provides an image pickup apparatus that communicates with an external apparatus. The image pickup apparatus includes a receiving unit configured to receive, from the external apparatus, an instruction for changing a zoom position of a lens, a control unit configured to perform control processing to change a zoom position of the lens based on an instruction received by the receiving unit, and a determination unit configured to determine whether the external apparatus includes a predetermined function regarding zooming of the lens. In a case where the determination unit determines that the external apparatus includes the predetermined function regarding zooming of the lens, the control unit controls a zoom adapter, which performs a zoom setting of the lens and is attached to the lens, to change a zoom position of the lens based on of a zoom setting notified by the external apparatus. In a case where the determination unit determines that the external apparatus does not include the predetermined function regarding zooming of the lens, the control unit controls the zoom adapter to change a zoom position of the lens based on a zoom setting performed in the zoom adapter.

Further features will become apparent from the following description of exemplary embodiments with reference to the attached drawings.

DESCRIPTION OF THE EMBODIMENTS

First Embodiment

Figure 2:
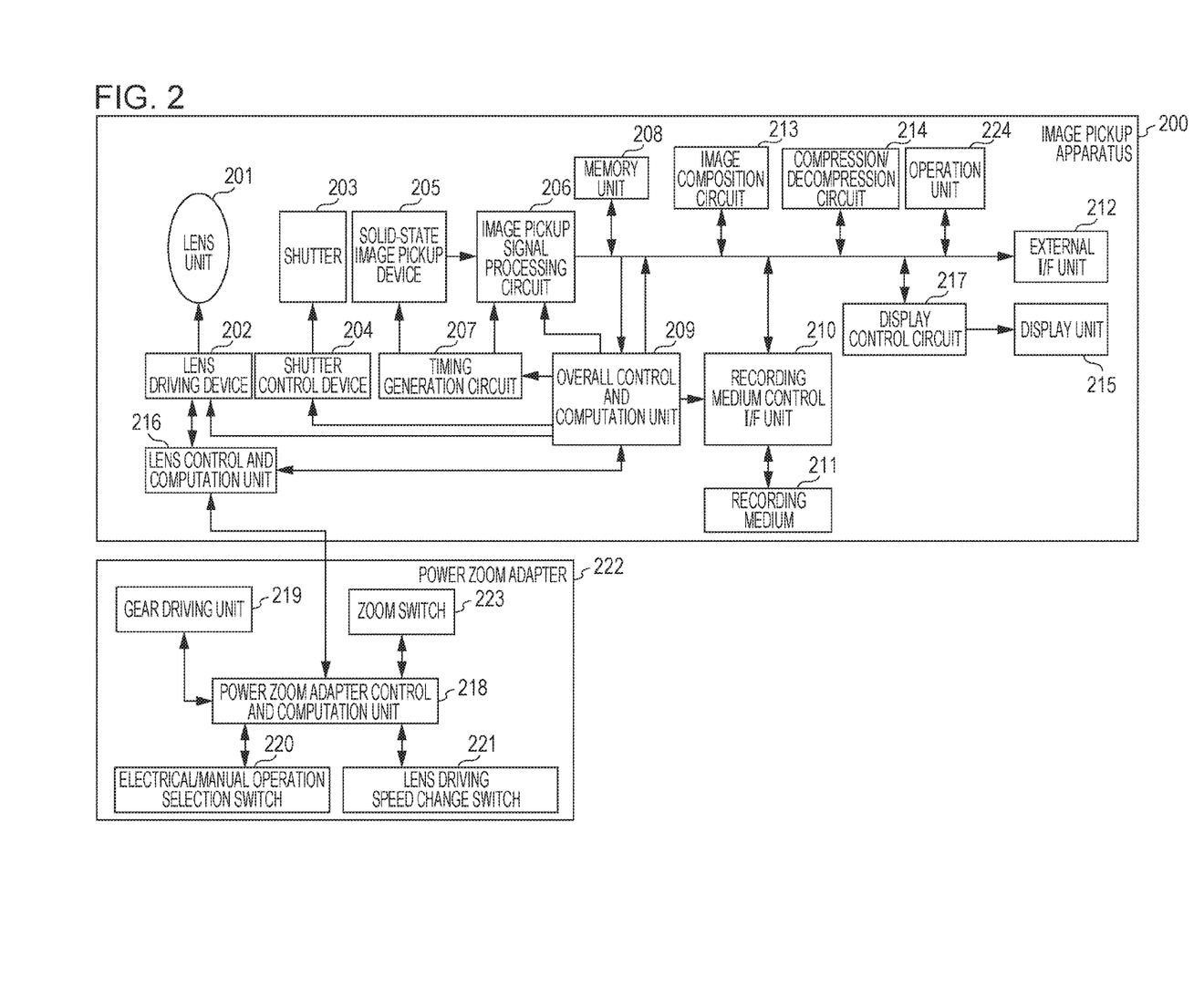
FIG. 2 is a diagram illustrating exemplary configurations of an image pickup apparatus and a lens adapter.

Embodiments will be described in detail below with reference to the accompanying drawings. FIG. 2 is a schematic diagram of an image pickup apparatus 200 according to an embodiment. Referring to FIG. 2, a lens unit 201 forms an optical image of a subject and a lens driving device 202 performs zoom control, focus control, diaphragm control, and the like.

A mechanical shutter 203 is controlled by a shutter control device 204. A solid-state image pickup device 2 receives a subject image formed by the lens unit 201 as an image signal. An image pickup signal processing circuit 206 performs various corrections, predetermined pixel interpolation processing, and color conversion processing upon an image signal output from the solid-state image pickup device 205.

A timing generation circuit 207 is a driving unit for outputting various timing signals to the solid-state image pickup device 205 and the image pickup signal processing circuit 206. An overall control and computation unit 209 is a control circuit for controlling various computations and the entire image pickup apparatus 200.

A memory unit 200 temporarily stores image data. A recording medium control I/F unit 210 records or reads data in or from a recording medium. A recording medium 211 is a detachable recording medium such as a semiconductor memory in or from which image data is recorded or read. An external I/F unit 212 is connected to an external apparatus in a wired or wireless manner and can perform communication via a wireless LAN or Bluetooth®, in these communications, a single piece of hardware can be shared or respective pieces of hardware can be prepared. Alternatively, only a part (e.g. antenna) of a piece of hardware can be shared.

An operation unit 224 includes a main power switch, a release button, and the like operated by a user.

The operation of a digital camera with the above-described configuration at the time of image capturing will be described.

When the main power switch in the operation unit 224 is turned on, a control system is powered on and an imaging system circuit such as the image Pickup signal processing circuit 206 is also powered on.

When the release button in the operation unit 224 is pressed, distance measurement computation is performed based on data output from the image pickup device. The overall control and computation unit 209 computes a distance to a subject based on a result of the distance measurement. Subsequently, the lens driving device 202 drives the lens unit and it is determined whether the lens unit is in focus. When the lens unit is determined to be out of focus, the lens unit is driven again and the distance measurement is performed. The distance measurement computation can be performed with the use of data output from a device dedicated for distance measurement (not illustrated) other than the data output from the image pickup device.

After the lens unit has been determined to be in focus, an image capturing operation is started. When the image capturing operation is finished, an image signal output from the solid-state image pickup device 205 is subjected to image processing in the image pickup signal processing circuit 206, and is written in the memory by the overall control and computation unit 209. A compression/decompression circuit 214 includes a function of compressing stored image data into, for example, JPEG data in accordance with a predetermined image compression method (adaptive discrete cosine transformation (ADCT) or the like, for example), and writing the compressed image data in the memory unit 208, and a function of decompressing the image data read from the memory unit 208 and writing the decompressed image data in the memory unit 208.

A display unit 215 displays a menu operation screen of the image pickup apparatus 200 and a captured image. A display control circuit 217 causes the display unit 215 to output image data stored in the memory unit 208.

A lens control and computation unit 216 operates the lens driving device 202 based on an instruction transmitted from the overall control and computation unit 209, and communicates with the lens driving device 202 to acquire, from the lens driving device 202, lens-specific information such as information about a position to which a lens can move, information about a speed at which the lens can be driven, or information about characteristics of lens sound specific to the lens.

A part or all of the lens unit 201, the lens driving device 202, and the lens control and computation unit 216 can be integrally provided with the image pickup apparatus 200 or separately provided from the image pickup apparatus 200 (provided as an interchangeable lens). In the following embodiments, an exemplary case in which an interchangeable lens is used will be described.

Next, a power zoom adapter 222 will be described. The power zoom adapter 222 according to the present embodiment is physically connected to an interchangeable lens, and changes the zoom position of the interchangeable lens by transmitting the driving power of a motor or the like to a lens barrel using a gear driving unit 219 and rotating the lens barrel. With this configuration, a lens that is unable to be subjected to electric zoom control can have a power zoom function. The power zoom adapter 222 can perform zoom control based on a lens driving instruction transmitted from an external apparatus. Specifically, the image pickup apparatus 200 receives a driving instruction transmitted from an external apparatus such as a PC or a smart phone that is a kind of a mobile phone via the external I/F unit 212 and transmits the drying instruction to the power zoom adapter. As a result, the external apparatus can indirectly instruct the power zoom adapter to perform zoom control. The power zoom adapter can receive the driving instruction via the image pickup apparatus 200 (and an interchangeable lens) or can be configured to receive the driving instruction directly from the external apparatus using a communication IF therein.

In a case where a user wants to manually rotate a barrel without using the power zoom function of the power zoom adapter 222 such as when using a common interchangeable lens, a manual operation is selected by an electrical/manual operation selection switch 220. In a case where a user wants to use the power zoom function, an electrical operation is selected by the electrical/manual operation selection switch 220.

A zoom switch 223 is an operation unit used for an actual zoom operation. Two types of switches, a telephoto switch and a wide-angle switch, are provided therein. While any one of these switches is pressed and held down, a zoom position is changed to a direction corresponding to the switch. A zoom speed can be adjusted based on a force of pressing the zoom switch 223.

Figure 3:
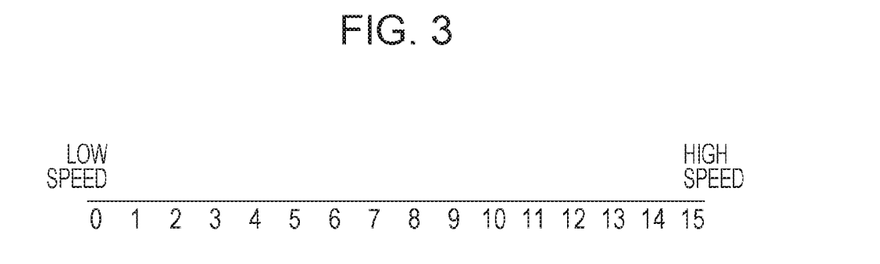
FIG. 3 is a diagram illustrating a settable zoom speed.

FIG. 3 is a diagram illustrating step numbers settable for the power zoom adapter 222. The smaller the step number, the lower the speed. The larger the step number, the higher the speed. The larger the force of pressing the zoom switch 223, the larger the step number at the time of zooming.

A lens driving speed change switch 221 is used to change the lens driving speed of the power zoom adapter 222. Two types of switch states, SLOW and FAST, are provided. The setting of a zoom speed, which is a kind of zoom setting, is changed by changing a switch position to any one of these states. When the switch position is located on a SLOW side, a lens can be operated at a low zoom speed. When the switch position is located on a FAST side, the lens can be operated at a high zoom speed. That is, the amount of zoom change during the pressing of the zoom switch 223 can be changed by the lens driving speed change switch 221. As described above, in the present embodiment, a zoom speed (the step number in FIG. 3) can be adjusted based on the degree of pressing of the zoom switch 223. Accordingly, even when the degree of pressing (the step number) does not change, the zoom speed varies depending on the state (SLOW or FAST) of the lens driving speed change switch 221. For example, in a case where a rapid change in zoom position needs to be avoided, such as during the capturing of a moving image, the rapid change in zoom position caused by the hard pressing of the zoom switch 223 can be avoided by placing the lens driving speed change switch 221 to the SLOW side.

A method of externally controlling the power zoom adapter 222 will now be described. In the present embodiment, two types of apparatuses for controlling the power zoom adapter 222, an external remote controller and a smart phone, are prepared.

First, control performed by an external remote controller will be described. An external remote controller according to the present embodiment is a remote controller that communicates with the external I/F unit 212 in the image pickup apparatus 200 via Bluetooth®.

Figure 5:
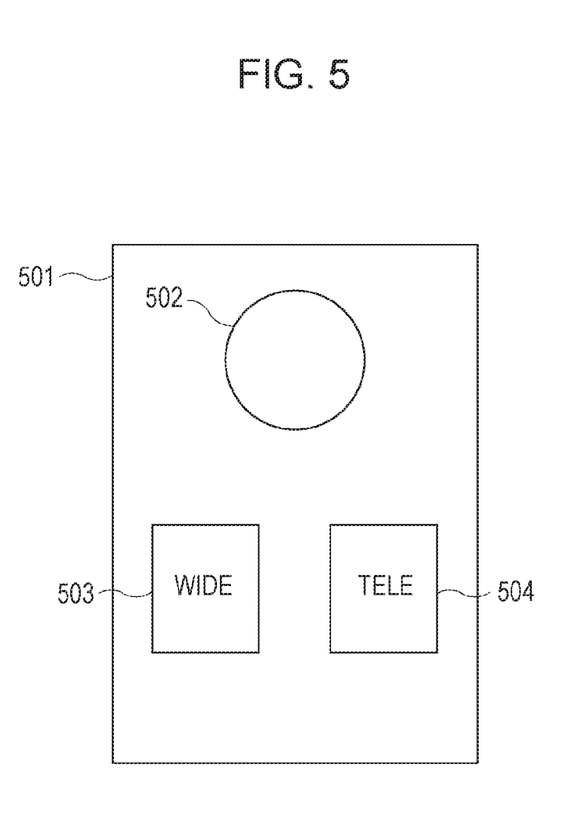
FIG. 5 is a block diagram of an external remote controller.

FIG. 5 is a diagram illustrating an example of an external remote controller. An external remote controller 501 includes a release button 502, a wide-angle button 503, and a telephoto button 504. The release button 502 is used to transmit an image pickup instruction to the image pickup apparatus 200. The wide-angle button 503 and the telephoto button 504 are used to transmit a zoom driving instruction for the power zoom adapter 222.

Next, control performed by a smart phone will be described. In order to enable a smart phone to operate the image pickup apparatus 200 and the power zoom adapter 222, an application for the image pickup apparatus 200 needs to be installed in the smart phone in advance. It is noted that a "smart phone" to be described below has an application for the image pickup apparatus 200 installed therein. Instead of a smart phone used in the present embodiment, a tablet terminal or a personal computer can be used.

Figure 6:
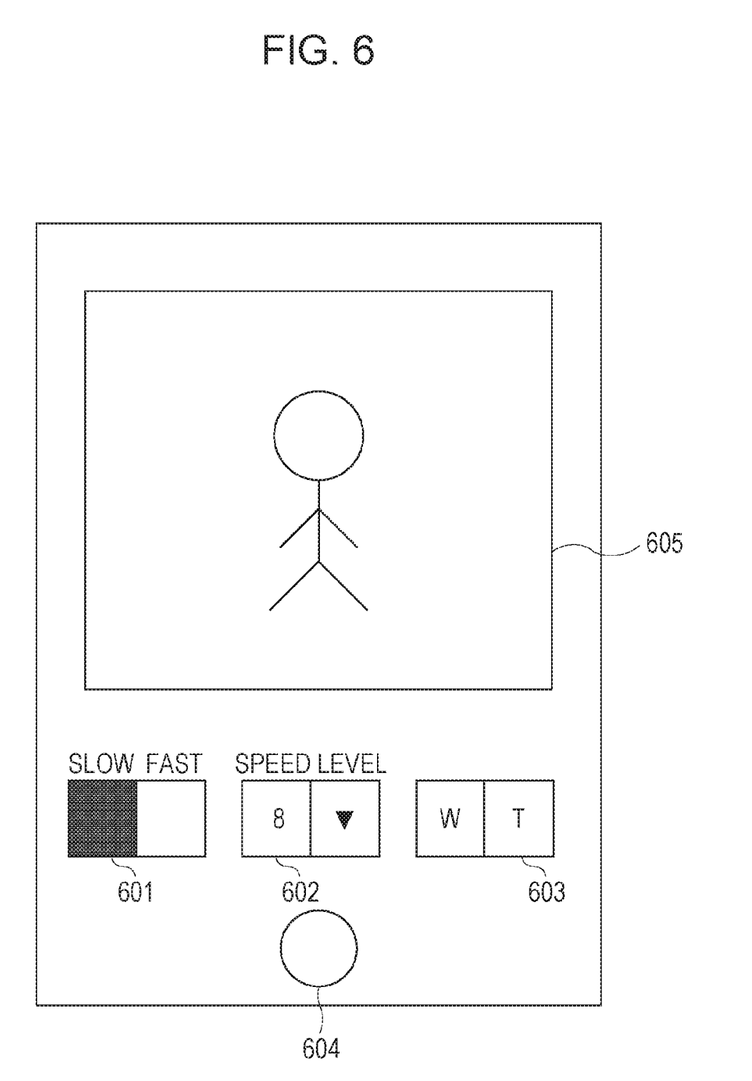
FIG. 6 is a diagram illustrating a user interface (UI) for an application displayed on a smart phone.

FIG. 6 is a diagram illustrating an exemplary control screen for the image pickup apparatus 200 that is displayed on a smart phone. A button 601 is a switching unit for changing a zoom operation speed, and can switch between SLOW and FAST. This switching is the same as the switching between SLOW and FAST set in the power zoom adapter 222. A button 602 is a speed specifying unit. Any one of the steps of 0 to 15 illustrated in FIG. 3 can be set as a speed level. A button 603 is a direction instruction button. In order to enable the power zoom adapter 222 to perform a wide-angle zoom operation, a W button is pressed and held down. In order to enable the power zoom adapter 222 to perform a telephoto zoom operation, a T button is pressed and held down. A live view screen 605 is a region where a live view image being captured by the image pickup apparatus 200 is displayed in real time.

As described above, three types of methods of operating the power zoom adapter 222, a method of operating the power zoom adapter 222 by itself, a method of causing an external remote controller to operate the power zoom adapter 222, and a method of causing a smart phone to operate the power zoom adapter 222, are prepared. In the present embodiment, the external remote controller does not include a unit for controlling a zoom speed, whereas the power zoom adapter 222 and the smart phone include zoom speed control units on respective control screens. The setting of a zoom speed of a lens performed in consideration of the difference in the operation methods can be an issue. In the present embodiment, a method of controlling the zoom speed of a power zoom adapter based on the type of an external apparatus will be described.

A process performed by the image pickup apparatus 200 according to the present embodiment will be described below with reference to a flowchart illustrated in FIG. 1. A control unit included in each apparatus controls respective units of the apparatus based on an input signal or a program, thereby realizing the processing of the apparatus. In the flowchart illustrated in FIG. 1, it is assumed that the communication between the image pickup apparatus 200 and a smart phone is established in advance via a wireless LAN and the communication between the image pickup apparatus 200 and an external remote controller is established in advance via Bluetooth®.

First, in S101, the external I/F unit 212 in the image pickup apparatus 200 receives a driving request command of the power zoom adapter 222 by Point-to-Point (PTP) communication or Bluetooth® communication.

In S102, the image pickup apparatus 200 determines whether the type of an external apparatus that transmitted the request for driving the power zoom adapter 222 thereto is an external apparatus that specifies the speed of a power zoom adapter. For this determination method, the types of external apparatuses (an external remote controller, a smart. phone, and the like) to be connected to the image pickup apparatus 200 are selected in a menu before connection and pieces of information about the selected types of external apparatuses are stored. Alternatively, a communicating driver layer can acquire information about the type of an external apparatus and notify an application layer of the information. As information used for the determination, information about the type (an external remote controller, a smart phone, or the like) of an apparatus or information representing whether an apparatus can specify a zoom speed can be acquired. The branching of S102 will be described below.

First, a case where it is determined in S102 that the type of an external apparatus that transmitted the driving request is not an external apparatus that can specify the speed of a power zoom adapter (an external remote controller according to the present embodiment) will be described. As described above, the external remote controller 501 does not include an operation unit for specifying a zoom speed. Accordingly, the external remote controller 501 transmits an instruction for zooming in a telephoto/wide-angle direction and no instruction for zooming at a high/low speed. The process proceeds to S103 in which the image pickup apparatus 200 checks whether the lens driving speed change switch 221 in the power zoom adapter 222 is located on the SLOW or FAST side.

In a case where the switch position is on the SLOW side in S104, an instruction for operating at a low speed is transmitted to the power zoom adapter control and computation unit 218 in S107. A low-speed operation instructed in S107 is an operation at a relatively small step number (that is, 0 to 7) illustrated in FIG. 3. In the present embodiment, an operation at the step 2 is specified.

In a case where the switch position is on the FAST side in S104, an instruction for operating at a high speed is transmitted from the overall control and computation unit 209 to the power zoom adapter control and computation unit 218 in S105. A high-speed operation instructed in S105 is an operation at a relatively large step number (that is, 9 to 15) illustrated in FIG. 3. In the present embodiment, an operation at the step 9 is specified.

Next, a case where it is determined in S102 that the type of an external apparatus that transmitted the driving request is an external apparatus that can specify the speed of a power zoom adapter (a smart phone according to the present embodiment) will be described.

A smart phone can set a zoom speed on the control screen illustrated in FIG. 6 as described above. The image pickup apparatus 200 is therefore notified of not only a zoom direction, but also a zoom speed by the smart phone. The process proceeds to S106 in which the image pickup apparatus 200 transmits an operation instruction to the power zoom adapter control and computation unit 218 based on the zoom speed and the zoom direction notified by the smart phone. That is, irrespective of the state of the lens driving speed change switch 221 in the power zoom adapter 222, driving is performed at the zoom speed notified by the smart phone.

As described above, an image pickup apparatus according to the present embodiment changes processing based on the type of an external apparatus from which a zoom instruction has been transmitted thereto. With this configuration, zoom control suitable for the type of each external apparatus can be performed.

Second Embodiment

In the first embodiment, the setting method of a zoom speed of the power zoom adapter 222 changed based on the type of an external apparatus. In the present embodiment, it is also considered whether a moving image is being recorded in the image pickup apparatus 200. During the recording of a moving image, it is desired that a zoom speed be low because lens driving sound can be recorded and AF tracking is not achieved owing to a zoom operation. It is therefore desired that an external apparatus perform an operation at the time of making a zoom instruction for the power zoom adapter 222 in consideration of the fact that a moving image is being recorded.

Figure 4:
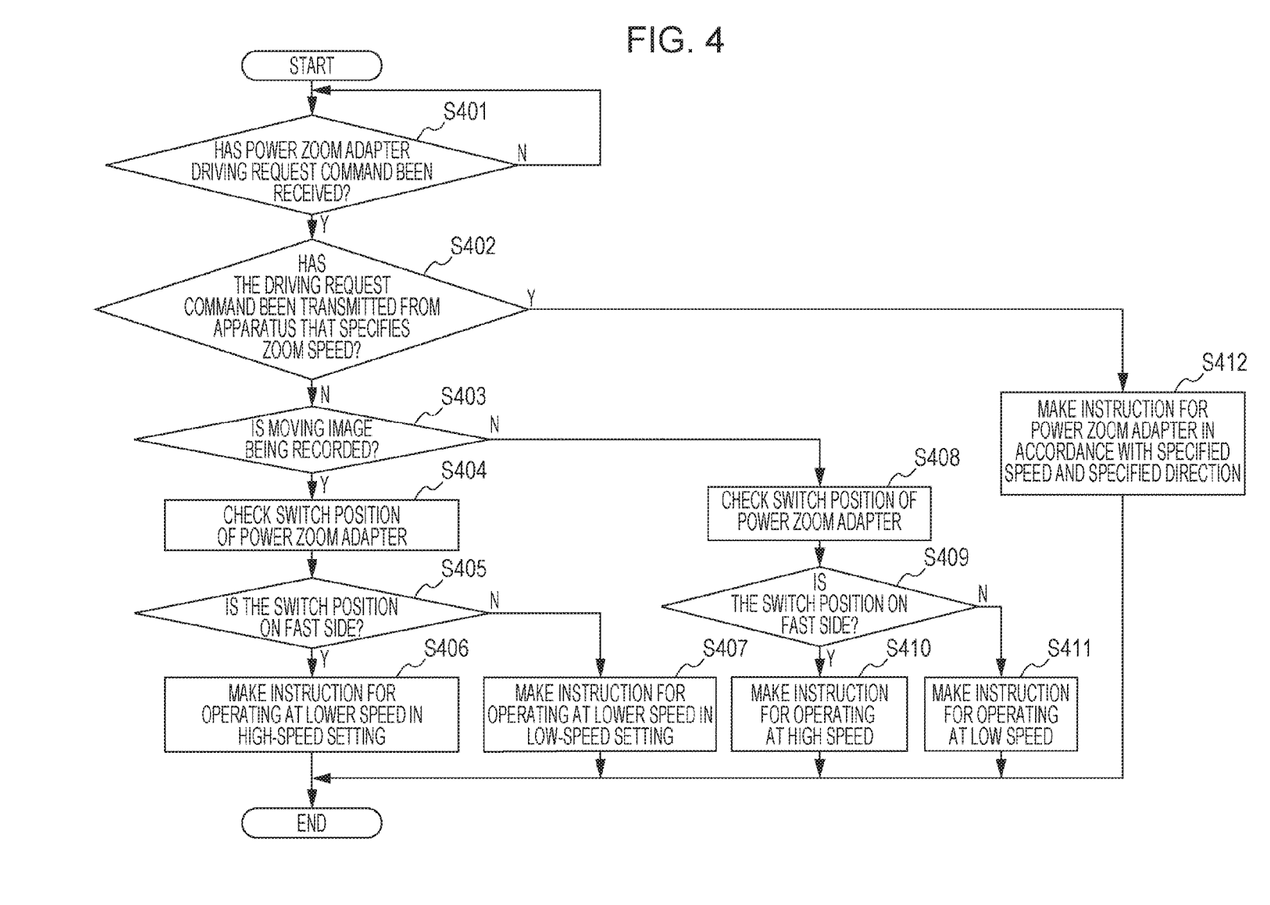
FIG. 4 is a flowchart describing a process according to a second embodiment.

A process performed by an image pickup apparatus according to the present embodiment will be described below with reference to a flowchart illustrated in FIG. 4. In the present embodiment, the description of a part common to the first embodiment will be omitted and a part unique to the present embodiment will be described.

Figure 1:
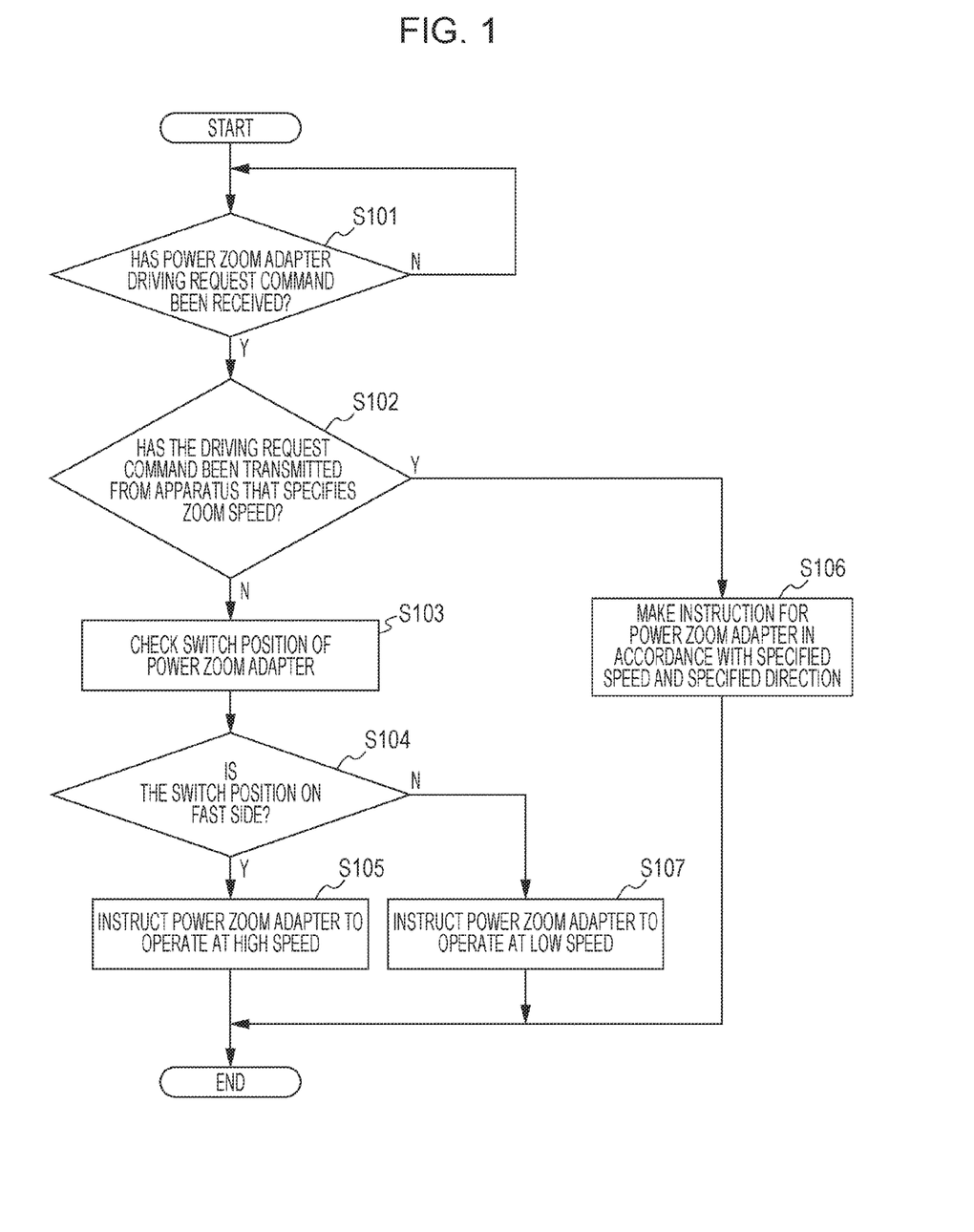
FIG. 1 is a flowchart describing a process according to a first embodiment.

In S401 and S402, processing similar to the processing described with reference to FIG. 1 is performed.

In S403, the image pickup apparatus 200 determines whether a moving image is being recorded therein. In a case where it is determined that a moving image is not being recorded, processing similar to the processing of S103 to S105 and S107 described with reference to FIG. 1 is performed in S408 to S411.

In a case where it is determined in S403 that a moving image is being recorded, the state of the lens driving speed change switch 221 in the power zoom adapter 222 is checked in S404. In a case where it is determined in S405 that the switch position is on the FAST side, the overall control and computation unit 209 transmits an instruction for operating at a low zoom speed to the power zoom adapter control and computation unit 218 in S406. In the present embodiment, the step 5 illustrated in FIG. 3 is set. In a case where it is determined in S405 that the switch position is on the SLOW side, the overall control and computation unit 209 transmits an instruction for operating at a lower zoom speed in the low speed setting to the power zoom adapter control and computation unit 218 in S407. In the present embodiment, the step 0 illustrated in FIG. 3 is set.

The process of the image pickup apparatus 200 according to the second embodiment has been described above. The feature of the present embodiment is that an image pickup apparatus can perform a speed control based on an image capturing state while considering the switch position of the power zoom adapter 222 even when an instruction is transmitted from an external remote controller that is incapable of specifying a zoom speed.

Other Embodiments

In the above-described embodiments, it is determined whether a speed set in the power zoom adapter 222 is employed for zooming based on a result of determining whether an external apparatus that is a communication target can change a zoom speed. There is another method of employing a setting performed in the power zoom adapter 222 in a case where information about a zoom speed has not been acquired from an external apparatus. With this method, the image pickup apparatus 200 does not need to have a mechanism for determining the type of an external apparatus.

In the above-described embodiments, the power zoom adapter 222 performs lens driving. However, as described above, a part or all of the lens unit 201, the lens driving device 202, and the lens control and computation unit 216 can be integrally provided with the image pickup apparatus 200. In this case, the image pickup apparatus 200 includes the lens driving speed change switch 221. The switch does not necessarily have to be physically provided. For example, an item for setting a lens driving speed can be provided in a menu.

As an interchangeable lens, an electric lens that does not need the power zoom adapter 222 can be used. In this case, the image pickup apparatus 200 or the interchangeable lens includes the lens driving speed change switch 221.

The functions of the above-described embodiments can also be realized by a computer (or a device such as a CPU or an MPU) of a system or an apparatus that reads out and executes software (or a program) supplied to the system or apparatus from a network or a storage medium of various types.

According to the above-described embodiments, zoom control can be performed using a setting suitable each external apparatus.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025379 filed Feb. 14, 2017 which is hereby incorporated by reference herein in its entirety.

What is claimed is:

1. An image pickup apparatus that communicates with an external apparatus comprising:
    a processor; and
    a memory storing a program for causing, when executed by the processor, the image pickup apparatus to function as:
    a receiving unit configured to receive, from the external apparatus, an instruction for changing a zoom position of a lens;
    a control unit configured to perform control processing to change a zoom position of the lens based on the instruction received by the receiving unit; and
    a determination unit configured to determine whether the external apparatus includes a predetermined function regarding zooming of the lens, wherein the predetermined function includes a function for setting a speed of zooming,
    wherein, in a case where the determination unit determines that the external apparatus includes the predetermined function regarding zooming of the lens, the control unit controls a zoom adapter, which is physically attached to the lens and is capable of driving the lens by rotating a lens barrel, to change a zoom position of the lens based on a zoom setting notified by the external apparatus, and
    wherein, in a case where the determination unit determines that the external apparatus does not have the predetermined function regarding zooming of the lens, the control unit controls the zoom adapter to change a zoom position of the lens based on a zoom setting performed in the zoom adapter.

2. The image pickup apparatus according to claim 1, further comprising an acquisition unit configured to acquire a zoom setting performed in the zoom adapter.

3. The image pickup apparatus according to claim 1, wherein the zoom setting includes a setting of a zoom speed of the lens.

4. The image pickup apparatus according to claim 1, wherein the image pickup apparatus receives an instruction for setting a zoom speed of the lens from the external apparatus.

5. The image pickup apparatus according to claim 1, wherein the determination unit determines whether the external apparatus includes the predetermined function regarding zooming of the lens based on a type of the external apparatus.

6. The image pickup apparatus according to claim 5, wherein the determination unit determines that the external apparatus includes the predetermined function regarding zooming of the lens in a case where the external apparatus is a mobile phone.

7. The image pickup apparatus according to claim 1, wherein the determination unit determines that the external apparatus does not include the predetermined function regarding zooming of the lens in a case where a predetermined zoom setting has not been received from the external apparatus.

8. The image pickup apparatus according to claim 1, wherein the image pickup apparatus communicates with a mobile phone and a remote control apparatus that are external apparatuses.

9. The image pickup apparatus according to claim 8, wherein zoom control performed with the mobile phone and zoom control performed with the remote control apparatus are executed based on different communication protocols.

10. The image pickup apparatus according to claim 9, wherein zoom control performed with the mobile phone is executed through communication via a wireless LAN.

11. The image pickup apparatus according to claim 9, wherein zoom control performed with the remote control apparatus is executed through communication via Bluetooth®.

12. A method of controlling an image pickup apparatus that communicates with an external apparatus comprising:
receiving, from the external apparatus, an instruction for changing a zoom position of a lens;
performing control processing to change a zoom position of the lens based on the received instruction; and
determining whether the external apparatus includes a predetermined function regarding zooming of the lens, wherein the predetermined function includes a function for setting a speed of zooming,
wherein, in a case where it is determined that the external apparatus includes the predetermined function regarding zooming of the lens, a zoom adapter, which is physically attached to the lens and is capable of driving the lens by rotating a lens barrel, is controlled to change a zoom position of the lens based on a zoom setting notified by the external apparatus, and
wherein, in a case where it is determined that the external apparatus does not have the predetermined function regarding zooming of the lens, the zoom adapter is controlled to change a zoom position of the lens based on a zoom setting performed in the zoom adapter.

13. A non-transitory computer readable storage medium storing a program for causing a computer to execute a method, the method comprising:
receiving, from an external apparatus, an instruction for changing a zoom position of a lens;
performing control processing to change a zoom position of the lens based on the received instruction; and
determining whether the external apparatus includes a predetermined function regarding zooming of the lens, wherein the predetermined function includes a function for setting a speed of zooming,
wherein, in a case where it is determined that the external apparatus includes the predetermined function regarding zooming of the lens, a zoom adapter, which is physically attached to the lens and is capable of driving the lens by rotating a lens barrel, is controlled to change a zoom position of the lens based on a zoom setting notified by the external apparatus, and
wherein, in a case where it is determined that the external apparatus does not include the predetermined function regarding zooming of the lens, the zoom adapter is controlled to change a zoom position of the lens based on a zoom setting performed in the zoom adapter.

14. An apparatus that communicates with an external apparatus comprising:
a processor; and
a memory storing a program for causing, when executed by the processor, the apparatus to function as:
a receiving unit configured to receive, from the external apparatus, an instruction for changing a zoom position of a lens of an image pickup apparatus;
a control unit configured to perform control processing to change a zoom position of the lens based on the instruction received by the receiving unit; and
a determination unit configured to determine whether the external apparatus includes a predetermined function regarding zooming of the lens, wherein the predetermined function includes a function for setting a speed of zooming,
wherein, in a case where the determination unit determines that the external apparatus includes the predetermined function regarding zooming of the lens, the control unit controls a zoom adapter, which is physically attached to the lens and is capable of driving the lens by rotating a lens barrel, to change a zoom position of the lens based on a zoom setting notified by the external apparatus, and
wherein, in a case where the determination unit determines that the external apparatus does not have the predetermined function regarding zooming of the lens, the control unit controls the zoom adapter to change a zoom position of the lens based on a zoom setting performed in the zoom adapter.

15. The apparatus according to claim 14, wherein the determination unit determines whether the external apparatus includes the predetermined function regarding zooming of the lens based on a type of the external apparatus.

16. The apparatus according to claim 15, wherein the determination unit determines that the external apparatus includes the predetermined function regarding zooming of the lens in a case where the external apparatus is a mobile phone.

* * * * *